O. STANGE.

TIE FOR CONCRETE MOLDS OR FORMS.

APPLICATION FILED MAY 20, 1915.

Reissued Mar. 14, 1916.

14,089.

2 SHEETS—SHEET 1.

WITNESSES

W. J. Hohman

Elbert L. Hyde

INVENTOR

Otomar Stange

By Fred'k W. Mueller

Attorney

O. STANGE.

TIE FOR CONCRETE MOLDS OR FORMS.

APPLICATION FILED MAY 20, 1915.

Reissued Mar. 14, 1916.

14,089.

2 SHEETS—SHEET 2.

WITNESSES

W. T. Hohman

Elbert L. Hyde.

INVENTOR

Ottomar Stange,

By Frederick W. Winter,

Attorney

UNITED STATES PATENT OFFICE.

OTTOMAR STANGE, OF PITTSBURGH, PENNSYLVANIA.

TIE FOR CONCRETE MOLDS OR FORMS.

14,089. Specification of Reissued Letters Patent. Reissued Mar. 14, 1916.

Original No. 1,078,007, dated November 11, 1913, Serial No. 700,504. Application for reissue filed May 20, 1915. Serial No. 29,424.

*To all whom it may concern:*

Be it known that I, OTTOMAR STANGE, a citizen of the United States, and a resident of Pittsburgh, in the county of Allegheny and State of Pennsylvania, have invented certain new and useful Improvements in Ties for Concrete Molds or Forms, of which the following is a specification.

My invention relates to a tie for molds or forms for concrete or analogous plastic materials, and it has for its object to provide a rigid and sufficiently strong connection for keeping the molds or forms in required shape, dispensing with the necessity for other forms of bracing; providing a support or tie for any reinforcing material which may be used in the construction of a concrete or analogous plastic material; and which, when taken apart leaves the face of the concrete or analogous material free from any projecting metal, or other heterogeneous material, and permits the placing of scaffolds or other supports on the face of the concrete without any other shoring whatsoever.

Figure 1:
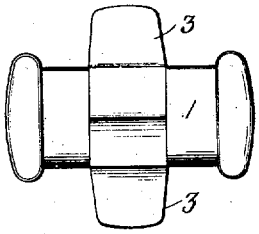
Figure 2:
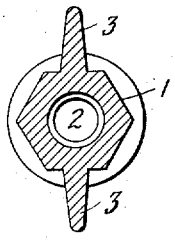
Figure 3:
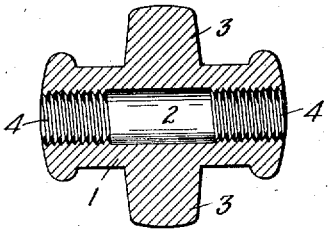
Figure 4:
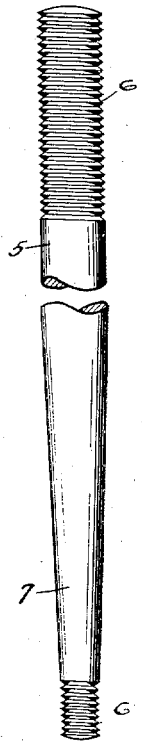
Figure 5:
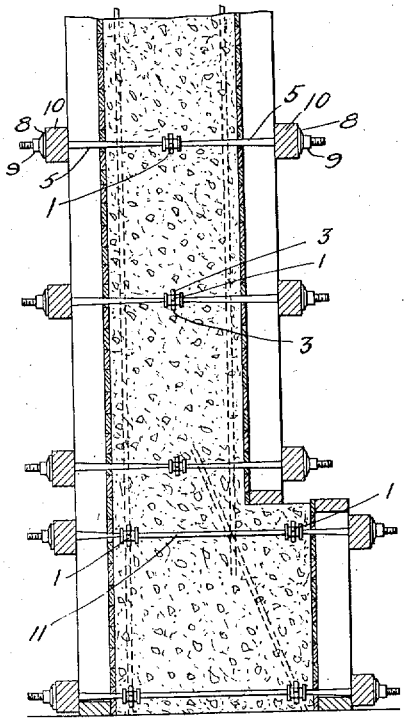
Figure 6:
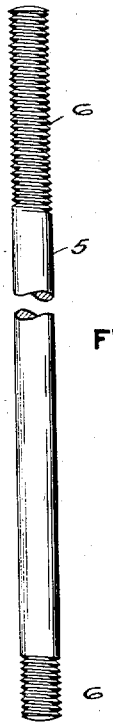
Figure 7:
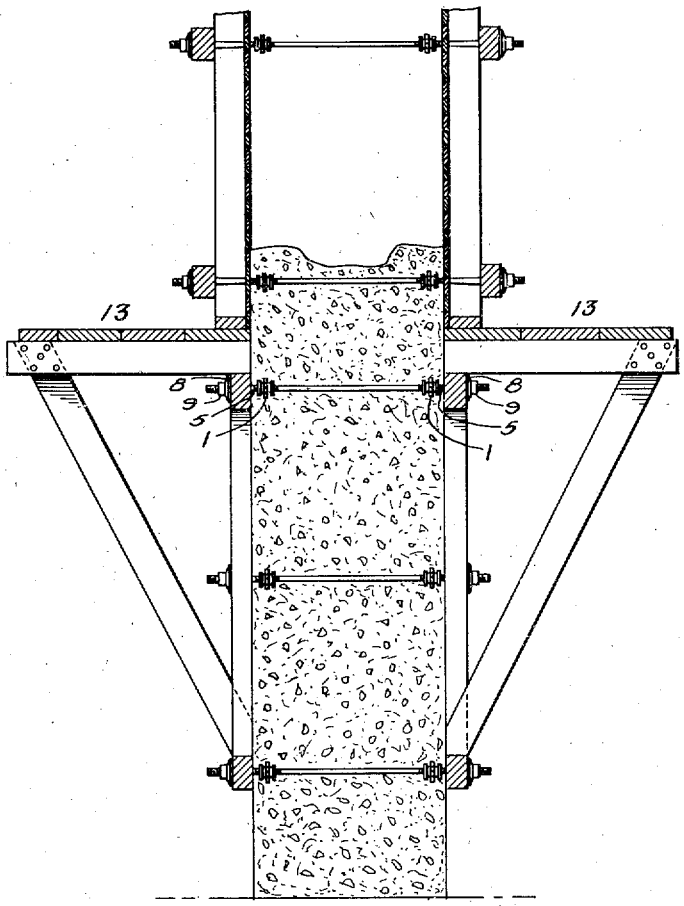
Figure 8:
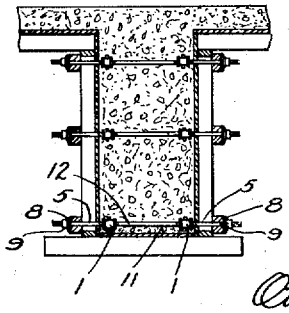

In the accompanying drawing, Figure 1 is a plan view of the coupling device, Figs. 2 and 3 are cross and longitudinal sectional views thereof, Figs. 4 and 5 are views of the tie rod, Fig. 6 is a view in section of a concrete wall, incased in a mold or form secured by the completed tie, Fig. 7 is a view of a scaffold or support in place, against the face of a concrete wall, and Fig. 8 is a cross section of a concrete beam, showing reinforcing bars supported by the tie.

In the drawings, A designates a mold or form such as is commonly used in the production of concrete structures, and which in order to retain its required shape and line, must be securely tied or braced, such tying or bracing to be sufficient to prevent any deformation whatsoever of the alinement of said molds or forms.

1 designates a coupling device, which, as shown, is round at the ends and hexagonal in cross section intermediate the ends, but which may be of any other suitable shape in cross section. This coupling is of malleable iron and is cored in the center, longitudinally, as shown at 2, and tapped as shown at 4. From the sides of the coupling device, lugs or wings 3 project radially, which anchor the coupling device in the concrete or analogous plastic material, binding the coupling device in such a manner that the tie rod can be readily withdrawn.

5 designates the tie rod or bolt which passes through the molds from the outside, through part of the concrete or analogous material and screws or fastens into the coupling device 1. That end of the rod 5 passing through the material and fastening into the coupling device 1 may be tapered as indicated at 7, or the rod may be plain as shown in Fig. 5. The object of this taper is to allow the rod to be readily withdrawn from the material, a turn of the rod being sufficient to free the same from the incasing material, saving the threads, and also allowing it to be replaced in the material. As shown at 6, the rod is threaded at both ends, the end going into the material having sufficient threads to screw into the coupling 1, and the outer end having a longer threaded end, to permit ready adjustments to the molds or forms.

By means of nuts 9 and washers 8, of sufficient size for requisite bearing area, the tie rods 5 engage longitudinal or vertical braces 10. These braces are preferably of wood and are spaced methodically and systematically, with holes bored in them for the rods a fixed distance apart, rendering it possible to use these braces many times.

For molds or forms of a certain width, preferably eighteen inches or under, two tie rods 5 may be fastened into a single coupling device 1 in the center of the concrete or analogous plastic material, the coupling device remaining in the material when the rods are withdrawn. But for wider constructions, as shown in Fig. 7, the coupling or connection between the two opposite tie rods 5 may consist of a plain rod or bolt 11, of a length varying according to the width of the required mold or form, and threaded at both ends to receive one of the coupling devices 1. The coupling or connection consisting of the bolt 11 and the two coupling devices 1 on its ends remains in the concrete or material when the tie rods are withdrawn.

12 in Fig. 8 represents reinforcing bars in a concrete beam supported by a tie made up of the coupling 1, the tie rods 5 and rod 11, and are secured to the ties by wire or similar fastenings. It is possible to so space the ties that the reinforcement can be placed in the specified location, and the reinforcement is thus rendered immovable both before and during the process of placing the material. In like manner reinforcing bars or other reinforcements in a wall or other form of construction are taken care of, supporting the reinforcements as well as keeping the same in proper position.

13 in Fig. 7 represents a scaffold made up in such a manner as to support molds or forms for additional lifts of construction, and serves any purpose whatsoever for which other forms of scaffolding are required. The rod 5 is readily replaced in the coupling device 1 after the mold or form is removed from the completed work, and by this means timbers are bolted to the walls, beams or other forms of construction, and upon these timbers a platform as shown is constructed. The molds for a higher lift can be placed upon this platform, and are also bolted to the surface of the completed work by means of rod 5 and coupling 1, thus insuring a smooth joint between the completed work and the new work to be done, and also adding to the strength of the mold or form.

It will be readily appreciated that when the molds or forms are tied in accordance with my invention a tie is produced which is absolutely rigid, in that it holds the mold to its required dimensions and lines; the assemblage of the parts of the tie may be speedily and economically carried out at the time of the construction of the molds or forms; the tie rods can be quickly and easily withdrawn after the material has acquired sufficient strength, and be repeatedly used in this manner. A further advantage is the saving in cost of labor and material in using the rod and coupling for bolting a scaffold on the finished work, saving all shoring. The hole left in the face of the work by the rod can be quickly and cheaply filled when there is no longer any necessity for its use, leaving the face of the material in a smooth condition, and with a pleasing appearance. It will further be noted that the rods serving as supports for any reinforcing material which may be used in the construction, causes the reinforcement to be embedded in its proper position and the use of nails and similar fastenings in the molds or forms is thus avoided.

What I claim is:—

1. A coupling adapted to be embedded in a plastic wall during the erection of the same, comprising a body having a threaded bore, the intermediate portion of the body being provided at opposite sides with radially disposed wings extending beyond the periphery of the end portions of the body, said wings being relatively broad with their broad sides disposed longitudinally of the body, the end portions of the body being of greater diameter than the intermediate portion and thereby strengthening the ends of the coupling.

2. A coupling adapted to be embedded in a plastic wall during the erection of the same comprising a body provided with a longitudinal threaded bore, the intermediate portion of the periphery of the body consisting of a plurality of angularly disposed faces, the ends of the body being circular in elevation and of greater diameter than the said intermediate portion of the body, whereby the end portions of the coupling are strengthened, the body being provided at the opposite sides of its intermediate portion and between the said end portions with radially disposed wings extending beyond the periphery of the end portions, said wings being relatively broad and thin and having their broad sides disposed longitudinally of the body and their thin sides transversely thereof.

In testimony whereof I affix my signature in presence of two witnesses.

OTTOMAR STANGE.

Witnesses:
EMMA LEA MONTGOMERY,
C. E. FOLT.